United States Patent
Naganuma et al.

(10) Patent No.: US 9,899,690 B2
(45) Date of Patent: Feb. 20, 2018

(54) METHOD OF DISCHARGING WATER FROM FUEL CELL AND FUEL CELL SYSTEM

(71) Applicant: TOYOTA JIDOSHA KABUSHIKI KAISHA, Toyota-shi, Aichi-ken (JP)

(72) Inventors: Yoshiaki Naganuma, Toyota (JP);
Tomohiro Ogawa, Miyoshi (JP);
Tsuyoshi Maruo, Toyohashi (JP);
Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 118 days.

(21) Appl. No.: 14/929,653

(22) Filed: Nov. 2, 2015

(65) Prior Publication Data

US 2016/0141655 A1    May 19, 2016

(30) Foreign Application Priority Data

Nov. 14, 2014    (JP) .................................. 2014-231963

(51) Int. Cl.
| | |
|---|---|
| H01M 8/04119 | (2016.01) |
| B60L 11/18 | (2006.01) |
| H01M 8/04313 | (2016.01) |
| H01M 8/04746 | (2016.01) |
| H01M 8/04089 | (2016.01) |

(52) U.S. Cl.
CPC ..... *H01M 8/04156* (2013.01); *B60L 11/1881* (2013.01); *H01M 8/04164* (2013.01); *H01M 8/04179* (2013.01); *H01M 8/04313* (2013.01); *H01M 8/04753* (2013.01); *H01M 8/04761* (2013.01); *H01M 8/04097* (2013.01); *H01M 2250/20* (2013.01); *Y02T 90/32* (2013.01)

(58) Field of Classification Search
None
See application file for complete search history.

(56) References Cited

FOREIGN PATENT DOCUMENTS

| | | |
|---|---|---|
| JP | 2002-373688 A | 12/2002 |
| JP | 2007-157655 A | 6/2007 |
| JP | 2008-53086 | 3/2008 |
| KR | 2013-0064298 A | 6/2013 |

OTHER PUBLICATIONS

Machine translation of KR20130064298; Jun. 2013.*

* cited by examiner

*Primary Examiner* — Barbara L Gilliam
*Assistant Examiner* — Wyatt P McConnell
(74) *Attorney, Agent, or Firm* — Finnegan, Henderson, Farabow, Garrett & Dunner, LLP

(57) ABSTRACT

A method of discharging water from a mobile object, which includes a fuel cell, a gas-liquid separator, and a circulation pump, comprises: an inclined state detection step of detecting an inclined state of the mobile object with respect to a horizontal plane; a scavenging start step of starting to supply scavenging gas at a predetermined first supply flow rate to a gas flow path in the fuel cell, by driving the circulation pump; and a supply flow rate increase step of increasing, when the mobile object is in a predetermined inclined state in which an outlet of the gas flow path is directed upward against a direction of gravity, a rotational speed of the circulation pump so that the supply flow rate of the scavenging gas is increased to a second supply flow rate higher than the first supply flow rate after a predetermined period from starting to supply the scavenging gas.

8 Claims, 10 Drawing Sheets

FIRST SCAVENGING CONTROL

METHOD OF DISCHARGING WATER FROM FUEL CELL AND FUEL CELL SYSTEM

CROSS-REFERENCE TO RELATED APPLICATIONS

The present application claims priority to Japanese Patent Application No. (JP) 2014-231963 filed on Nov. 14, 2014, the contents of which are incorporated herein by reference.

BACKGROUND

Field

The present invention relates to a method of discharging water from a fuel cell and a fuel cell system.

Related Art

In a polymer electrolyte fuel cell, hereinafter simply referred to as "fuel cell", a large amount of water is produced as a result of a power generation reaction. In some cases, a scavenging processing with using scavenging gas is executed while an operation of the fuel cell is temporarily stopped or terminated, to reduce the water remaining in the system, as disclosed by JP2008-053086A for example.

In the technique disclosed in the JP2008-053086A, to facilitate discharging of water from the fuel cell system in a mobile object, a scavenging flow rate and a scavenging time are changed in accordance with an inclination angle of the mobile object. However, the inventor of the present application has found out that the configuration of simply changing the scavenging flow rate and the scavenging time in accordance with the inclination angle of the mobile object might cause the following problem.

For example, in a fuel cell system installed in a mobile object, exhaust gas from the fuel cell is separated into a gas component and a liquid component by a gas-liquid separator. In this configuration, the gas component is circulated to the fuel cell by a circulation pump, and the liquid component is temporarily stored in the gas-liquid separator and is then discharged as exhaust water. When the scavenging with a high scavenging flow rate is started in the fuel cell system by increasing the rotational speed of the circulation pump while the mobile object is inclined, the water stored in the gas-liquid separator might be sucked up by the circulation pump.

As described above, in some pipe configurations of the fuel cell system, the configuration of simply changing the scavenging flow rate and the scavenging time in accordance with the inclination angle of the mobile object might end up in hindering the discharging of water. Furthermore, the scavenging might cause problems such as increase in noise and consumed energy. All things considered, there is still a room for improvement in the technique of discharging the water from the fuel cell through the scavenging processing.

SUMMARY

In order to solve at least part of the problems in the mobile object installing the fuel cell described above, the present invention may be implemented by the following aspects.

(1) A first aspect of the present invention provides a method of discharging water from a mobile object. A mobile object may include a fuel, a gas-liquid separator, and a circulation pump. The fuel cell may discharge an exhaust gas. The gas-liquid separator may separate the exhaust gas into a gas component and a liquid component, and store the liquid component which is as an exhaust water. The circulation pump may send out the gas component flown from the gas-liquid separator. The method of this aspect may include an inclined state detection step, a scavenging start step, a discharging water step, and a supply flow rate increase step. The inclined state detection step may be a step of detecting an inclined state of the mobile object with respect to a horizontal plane. The scavenging start step may be a step of starting to supply scavenging gas at a predetermined first supply flow rate to a gas flow path in the fuel cell, by driving the circulation pump. The discharging water step may be a step of discharging the exhaust water stored in the gas-liquid separator while the scavenging gas is supplied to the fuel cell. The supply flow rate increase step may be a step of increasing, when the mobile object is in a predetermined inclined state in which an outlet of the gas flow path is directed upward against a direction of gravity, a rotational speed of the circulation pump so that the supply flow rate of the scavenging gas is increased to a second supply flow rate higher than the first supply flow rate after a predetermined period from starting to supply the scavenging gas. According to the method of this aspect, when the gas flow path outlet of the fuel cell is directed upward against the direction of gravity, the scavenging is executed at the second supply flow rate higher than the first supply flow rate, after the scavenging is executed at the first supply flow rate. Thus, discharging of the water accumulated in the fuel cell can be facilitated because the gas flow path outlet is directed upward against the direction of gravity. The scavenging at the second supply flow rate is executed after a certain amount of water is discharged by the scavenging at the first supply flow rate. Thus, even when the rotational speed of the circulation pump is increased for the scavenging at the second supply flow rate, the exhaust water is prevented from being sucked up by the circulation pump.

(2) In the above-described aspect, the inclined state detection step may be a step of acquiring an inclination angle of the mobile object with respect to the horizontal plane as a parameter expressing the inclined state of the mobile object, and the supply flow rate increase step may include a step of changing the second supply flow rate in accordance with the inclination angle. According to the method of this aspect, the discharging of water by the scavenging is facilitated when the gas flow path outlet of the fuel cell is directed upward against the direction of gravity.

(3) In the above-described aspect, the inclined state detection step may be a step of acquiring an inclination angle of the mobile object with respect to the horizontal plane as a parameter expressing the inclined state of the mobile object, and the discharging water step may be a step of discharging the exhaust water at a predetermined water discharge interval, and include a step of changing the water discharge interval in accordance with the inclination angle. According to the method of this aspect, the amount of water discharged is increased when the gas flow path outlet of the fuel cell is directed upward against the direction of gravity, and thus the discharging of water is facilitated.

(4) The above-described aspect may include a first scavenging step of scavenging a first gas flow path, which is the gas flow path supplied a first reactive gas that is one reactive gas used for the generating of the fuel cell, by using the scavenging gas as first scavenging gas; and a second scavenging step of scavenging a second gas flow path, which is provided in the fuel cell and supplied a second reactive gas that is another reactive gas, by supplying a second scavenging gas that is different from the first scavenging gas, and introducing an exhaust water discharged from the second gas flow path to an outside of the mobile object through a water discharge pipe connected to the fuel cell. In the first scavenging step, the scavenging start step, the discharging water step, and the supply flow rate increase step may be executed. In the second scavenging step, the inclined state of the mobile object with respect to the horizontal plane may be detected, and a step of increasing a flow rate of the second scavenging gas may be executed when the mobile object is in a predetermined inclined state where a direction of the water discharge pipe extending toward a downstream side is directed upward against the direction of gravity. In the method according to this aspect, discharging of water by the scavenging is facilitated on the first electrode side and on the second electrode side of the fuel cell.

(5) A second aspect of the present invention provides a fuel cell system installed in a mobile object. The fuel cell system according to this aspect may include a fuel cell, a gas-liquid separator, a circulation pump, an on-off valve, a controller, and an inclined state detector. The fuel cell may incorporate a gas flow path for reaction gas. The gas-liquid separator may separate exhaust gas from the fuel cell into a gas component and a liquid component, and store the liquid component as exhaust water. The circulation pump may circulate the gas component, obtained by the separation in the gas-liquid separator, to the fuel cell. The on-off valve may control discharging of the exhaust water from the gas-liquid separator through an opening and closing operation. The controller may execute a scavenging processing of circulating scavenging gas to the fuel cell by driving the circulation pump, and execute a water discharge processing of discharging the exhaust water from the gas-liquid separator by opening the water discharge valve while the scavenging gas is supplied to the fuel cell. The inclined state detector may detect an inclined state of the mobile object with respect to a horizontal plane. In the scavenging processing, the controller may start supplying the scavenging gas to the gas flow path in the fuel cell at a predetermined first supply flow rate, and when the mobile object is in a predetermined inclined state where an outlet of the gas flow path is directed upward against a direction of gravity, the controller may increase a rotational speed of the circulation pump so that the supply flow rate of the scavenging gas is increased to a second supply flow rate higher than the first supply flow rate after a predetermined period from starting to supply the scavenging gas. In the fuel cell system according to this aspect, when the gas flow path outlet of the fuel cell is directed upward against the direction of gravity, the scavenging is executed at the second supply flow rate higher than the first supply flow rate, after the scavenging is executed at the first supply flow rate. Thus, discharging of the water accumulated in the fuel cell can be facilitated because the gas flow path outlet is directed upward against the direction of gravity. The scavenging at the second supply flow rate is executed after a certain amount of water is discharged by the scavenging at the first supply flow rate. Thus, even when the rotational speed of the circulation pump is increased for the scavenging at the second supply flow rate, the exhaust water is prevented from being sucked up by the circulation pump.

It should be noted that not all of a plurality of components in each aspect of the present invention described above are essential, and part of the plurality of components may be changed, omitted, or replaced with other components, and part of the limitations may be omitted as appropriate in order to partially or entirely solve the problem described above or to partially or entirely achieve the advantageous effects described herein. Part or whole of the technical features in one aspect of the present invention described above may be combined with part or whole of the technical features in another aspect of the present invention described above to make an independent aspect of the present invention in order to partially or entirely solve the problem described above or to partially or entirely achieve the advantageous effects described herein.

The present invention may be implemented in various embodiments other than the method of discharging water from a fuel cell and the fuel cell system. For example, the present invention may be implemented in such embodiments as a mobile object including a fuel cell system, a method of discharging water executed in the mobile object, a method of controlling the fuel cell system, a computer program for executing these methods, and a non-transitory recording medium recording the computer program.

DESCRIPTION OF THE EMBODIMENTS

A. First Embodiment

Figure 1:
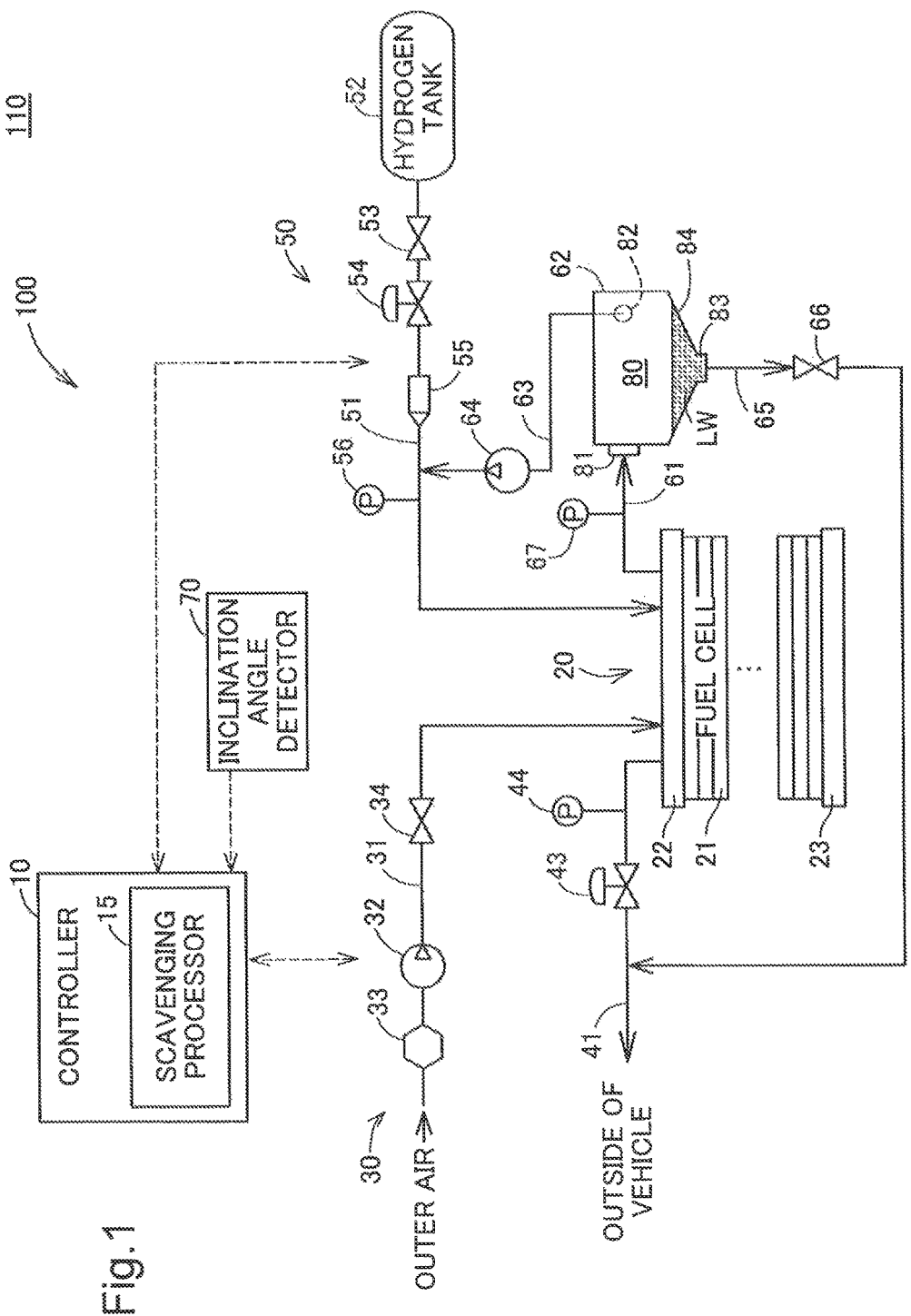
FIG. 1 is a schematic view illustrating a configuration of a fuel cell system according to a first embodiment.

FIG. 1 is a schematic view illustrating a configuration of a fuel cell system 100 according to a first embodiment of the present invention. The fuel cell system 100 is installed in a fuel cell vehicle 110, as one aspect of a mobile object, and outputs power mainly used as driving force for the fuel cell vehicle 110, in response to a request from a driver. The fuel cell system 100 includes a controller 10, a fuel cell 20, a cathode gas supplying unit 30, an anode gas supplying unit 50, and an inclination angle detector 70.

The controller 10 is formed of a microcomputer including a central processing unit and a main storage device, and loads a program onto the main storage device and executes the program to implement various functions. The controller 10 functions as a power generation controller that controls components of the fuel cell system 100 to cause the fuel cell 20 to generate power in accordance with an output request. The controller 10 also functions as a scavenging processor 15 that executes scavenging processing of discharging water from the fuel cell system 100. In the present embodiment, the scavenging processor 15 executes anode scavenging processing that performs scavenging on a gas flow path on an anode side in the fuel cell 20 and pipes 51, 61, 63, and 65 of the anode gas supplying unit 50. The anode scavenging processing will be described in detail later.

The fuel cell 20 is a polymer electrolyte fuel cell that generates power through an electrochemical reaction between hydrogen and oxygen with hydrogen (anode gas) as reaction gas and air (cathode gas) supplied thereto. The fuel cell 20 has a stacked structure formed by stacking a plurality of unit cells 21 one on top of the other. The unit cells 21 are each a power generating element capable of individually generating power. The unit cells 21 each include: a membrane electrode assembly as a power generating body formed by providing electrodes on both sides of an electrolyte membrane; and two separators (not illustrated) that interpose the membrane electrode assembly. The electrolyte membrane is a thin solid polymer film with excellent proton conductivity in a wet state of containing water therein. Manifolds (not illustrated), for reaction gas, are provided on outer circumference end portions of the unit cells 21. The manifold extends in a stacking direction of the unit cells 21 and is branched to be connected to power generation area of the unit cells 21. The unit cells 21 is stacked and fastened each other by being sandwiched in the stacking direction by first and second end plates 22 and 23. The first end plate is provided with connect portions that connect pipes 31 and 41 as well as the pipes 51 and 61 described later to the manifolds described above.

The cathode gas supplying unit 30 has a function of supplying cathode gas to the fuel cell 20 and a function of discharging exhaust water and cathode exhaust gas, discharged from a cathode side of the fuel cell 20, to the outside of the fuel cell system 100. The cathode gas supplying unit 30 includes a cathode gas pipe 31, an air compressor 32, an air flow meter 33, and an on-off valve 34 that are provided at an upstream side of the fuel cell 20. The cathode gas pipe 31 is connected to an inlet of a supplying manifold on the cathode side of the fuel cell 20. The air compressor 32 is connected to the fuel cell 20 through the cathode gas pipe 31, and takes in and compresses outer air, and supplies the resultant air as the cathode gas to the fuel cell 20.

The air flow meter 33 measures an amount of the outer air, which is taken in by the air compressor 32, at a portion on the upstream side of the air compressor 32, and transmits a measured value thus obtained to the controller 10. The controller 10 drives the air compressor 32 based on the measured value, and thus controls the supplied amount of the air to the fuel cell 20. The on-off valve 34 is provided between the air compressor 32 and the fuel cell 20. The on-off valve 34, closed in a normal state, opens when air at a predetermined pressure is supplied from the air compressor 32 to the cathode gas pipe 31.

The cathode gas supplying unit 30 further includes a cathode exhaust gas pipe 41, a pressure regulating valve 43, and a pressure measurement unit 44 that are provided at a downstream side of the fuel cell 20. The cathode exhaust gas pipe 41 is connected to an outlet of a discharging manifold on the cathode side of the fuel cell 20, and guides the exhaust water and the cathode exhaust gas to the outside of the fuel cell system 100. The pressure regulating valve 43 adjusts back pressure on the cathode side of the fuel cell 20 that is the pressure of the cathode exhaust gas in the cathode exhaust gas pipe 41. The pressure measurement unit 44 is provided on the upstream side of the pressure regulating valve 43, measures the pressure of the cathode exhaust gas, and transmits a measured value thus obtained to the controller 10. The controller 10 adjusts the aperture of the pressure regulating valve 43 based on the measured value from the pressure measurement unit 44.

The anode gas supplying unit 50 has a function of supplying the anode gas to the fuel cell 20, a function of discharging the anode exhaust gas, discharged from the fuel cell 20, to the outside of the fuel cell system 100, and a function of circulating the anode gas in the fuel cell system 100. The anode gas supplying unit 50 includes an anode gas pipe 51, a hydrogen tank 52, an on-off valve 53, a regulator 54, a hydrogen supplying device 55, and a pressure measurement unit 56 that are provided at the upstream side of the fuel cell 20. The hydrogen tank 52 is filled with high-pressure hydrogen to be supplied to the fuel cell 20. The hydrogen tank 52 is connected to the inlet of the supplying manifold on the anode side of the fuel cell 20 through the anode gas pipe 51.

In the anode gas pipe 51, the on-off valve 53, the regulator 54, the hydrogen supplying device 55, and the pressure measurement unit 56 are provided in this order from a side of hydrogen tank 52, that is, the upstream side. The controller 10 controls the opening and closing of the on-off valve 53, and thus controls the flow of hydrogen from the hydrogen tank 52 to the upstream side of the hydrogen supplying device 55. The regulator 54 is a pressure reducing valve for adjusting the pressure of hydrogen on the upstream side of the hydrogen supplying device 55. The opening degree of the regulator 54 is controlled by the controller 10. The hydrogen supplying device 55 is an electromagnetically driven on-off valve that is configured with an injector, for example. The pressure measurement unit 56 measures the pressure of hydrogen on the downstream side of the hydrogen supplying device 55, and transmits a measured value thus obtained to the controller 10. The controller 10 controls a driving interval, that is, an opening/closing interval of the hydrogen supplying device 55 based on the measured value from the pressure measurement unit 56, and thus controls the amount of hydrogen supplied to the fuel cell 20.

The anode gas supplying unit 50 further includes an anode exhaust gas pipe 61, a gas-liquid separator 62, an anode gas circulation pipe 63, a hydrogen circulation pump 64, an anode water discharge pipe 65, a water discharge valve 66, and a pressure measurement unit 67 that are provided at the downstream side of the fuel cell 20. The anode exhaust gas pipe 61 connects between the outlet of the discharging manifold on the anode side of the fuel cell 20 and the gas-liquid separator 62. The pressure measurement unit 67 is provided at the anode exhaust gas pipe 61. The pressure measurement unit 67 measures back pressure on the anode side of the fuel cell 20 that is the pressure of the anode exhaust gas at a portion near the outlet of a hydrogen manifold of the fuel cell 20, and transmits a measured value thus obtained to the controller 10.

The gas-liquid separator 62 separates the anode exhaust gas, which is flowed into the gas-liquid separator 62 through the anode exhaust gas pipe 61, into a gas component and a liquid component. The gas-liquid separator 62 is connected to the anode gas circulation pipe 63 and the anode water discharge pipe 65. The gas component of the anode exhaust gas obtained by the separation in the gas-liquid separator 62 is guided to the anode gas circulation pipe 63. The liquid component obtained by the separation in the gas-liquid separator 62 is stored in the gas-liquid separator 62 to be able to be discharged to the anode water discharge pipe 65 as the exhaust water.

The gas-liquid separator 62 is configured as a hollow container having an internal space 80. The gas-liquid separator 62 is provided with an inlet port 81 to which the anode exhaust gas pipe 61 is connected and an outlet port 82 to which the anode gas circulation pipe 63 is connected. The inlet port 81 and the outlet port 82 are each a through hole in communication with the internal space 80. The inlet port 81 and the outlet port 82 are configured to have opening directions crossing each other. In the present embodiment, the inlet port 81 and the outlet port 82 are configured to have opening directions substantially orthogonal to each other.

The gas-liquid separator 62 is further provided with a water discharge port 83 to which the anode gas circulation pipe 63 is connected. The water discharge port 83 as a through hole in communication with the internal space 80. The water discharge port 83 is formed at a position protruding beyond any other portions of the internal space 80. An inclined wall surface 84, inclined toward the water discharge port 83, is formed on the circumference of the water discharge port 83. In the fuel cell vehicle 110, the gas-liquid separator 62 has the inlet port 81 and the outlet port 82 positioned on the upper side and the water discharge port 83 and the inclined wall surface 84 positioned on the lower side.

The anode exhaust gas, introduced into the gas-liquid separator 62 from the anode exhaust gas pipe 61 through the inlet port 81, is guided to the outlet port 82 while colliding with the inner wall surface facing the inlet port 81 in the internal space 80. The liquid component flows into the internal space 80 through the inlet port 81 together with the anode exhaust gas, and collides and attaches on the inner wall surface of the internal space 80. Then, the liquid component flows downward in a direction of gravity, and is accumulated above the inclined wall surface 84 located around the circumference of the water discharge port 83, as exhaust water LW. As described above, the gas component obtained by the gas-liquid separation in the gas-liquid separator 62 flows into the anode gas circulation pipe 63 and the liquid component also obtained by the separation is stored in the internal space 80.

The anode gas circulation pipe 63 is connected to the portion of anode gas pipe 51 that is located in the downstream side of the hydrogen supplying device 55. The hydrogen circulation pump 64 is provided at the anode gas circulation pipe 63. The gas component, obtained by the separation in the gas-liquid separator 62, is transmitted to the anode gas pipe 51 to be circulated to the anode of the fuel cell 20 by the driving of the hydrogen circulation pump 64. The hydrogen circulation pump 64 corresponds to a subordinate concept of a circulation pump in the present invention.

The anode water discharge pipe 65 has an upstream end connected to the water discharge port 83 of the gas-liquid separator 62, and has a downstream end joined to the cathode exhaust gas pipe 41. The water discharge valve 66 is provided at the anode water discharge pipe 65. The water discharge valve 66 is an on-off valve that opens and closes in accordance with an instruction from the controller 10. The controller 10 keeps the water discharge valve 66 closed in a normal state, and opens the water discharge valve 66 at a predetermined timing set in advance. When the water discharge valve 66 is open, the exhaust water, stored in the internal space 80 of the gas-liquid separator 62, as well as inert gas in the anode exhaust gas, are discharged to the cathode exhaust gas pipe 41 through the anode water discharge pipe 65. Thus, the exhaust water and the anode exhaust gas, on the anode side, are discharged together with the exhaust water and the cathode exhaust gas on the cathode side.

The inclination angle detector 70 is configured with an acceleration sensor for example. The inclination angle detector 70 detects an inclination angle of the fuel cell vehicle 110 with respect to a horizontal plane, in a longitudinal direction and a width direction, respectively corresponding to a front and rear direction and a left and right direction. Then, the inclination angle detector 70 outputs the detection result to the controller 10. In this specification, the description related to directions such as "right", "left", "front", "rear", "upper", and "lower" is based on directions as viewed from the driver on the fuel cell vehicle 110. As described later, the scavenging processor 15 of the controller 10 executes the scavenging processing based on the detection result from the inclination angle detector 70.

The fuel cell system 100 further includes a coolant supplying unit (not illustrated or described in detail) that supplies a coolant to the fuel cell 20 to control an operation temperature of the fuel cell 20. The fuel cell system 100 further includes a secondary battery and a DC/DC converter (not illustrated). The secondary battery stores power output from the fuel cell 20 and regenerative power, and functions as a power source together with the fuel cell 20. The DC/DC converter controls charging and discharging of the secondary battery and the output voltage of the fuel cell 20. The fuel cell system 100 is operable at a power from the secondary battery after the operation of the fuel cell 20 is stopped.

Figure 2:
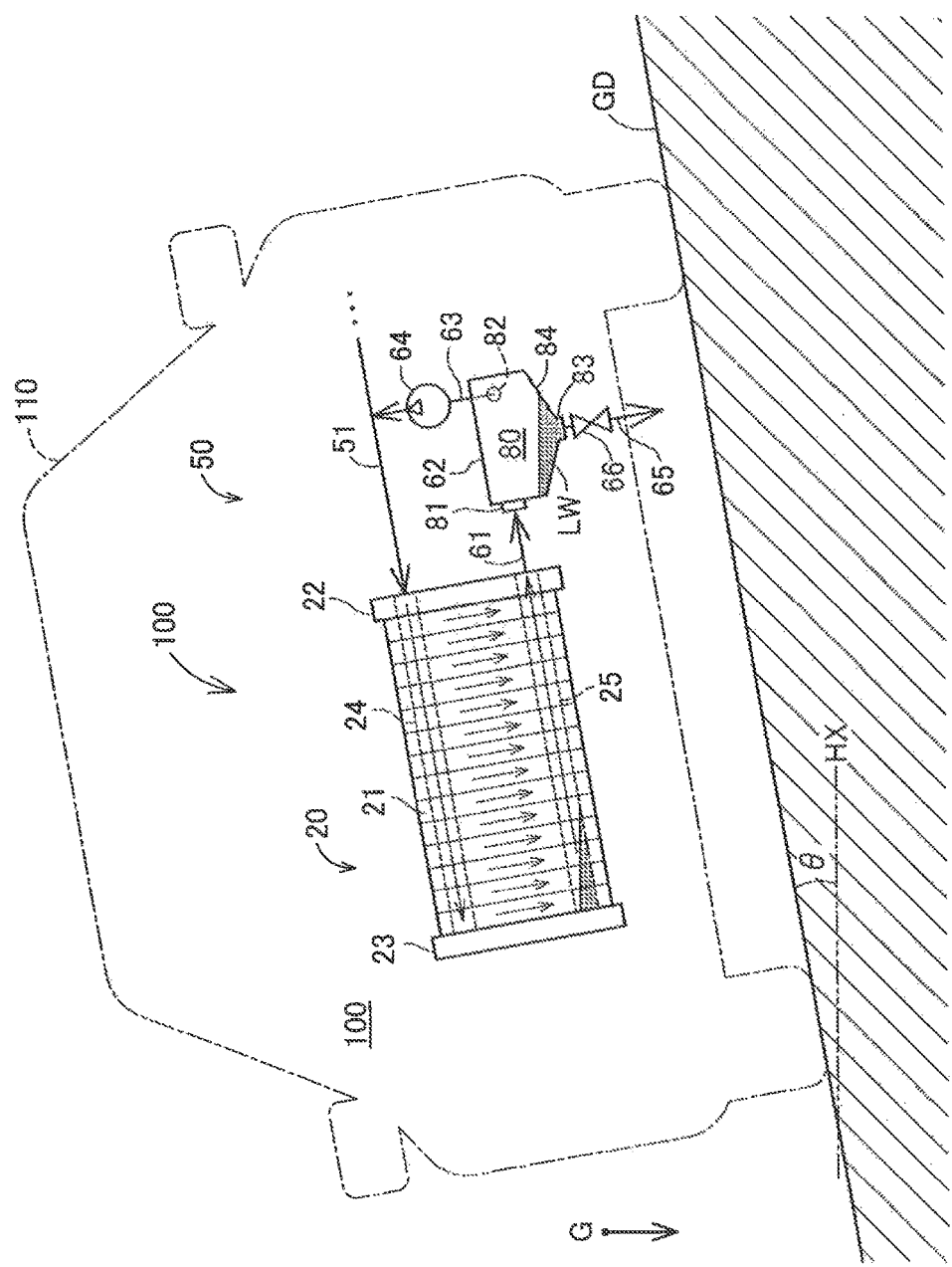
FIG. 2 is a schematic view illustrating a disposed state of a fuel cell in a fuel cell vehicle, and an overview of how scavenging gas is supplied by an anode gas supplying unit in a fuel cell vehicle.

FIG. 2 is a schematic view illustrating a disposed state of the fuel cell 20 in the fuel cell vehicle 110 and an overview of how the scavenging gas is supplied by the anode gas supplying unit 50. In FIG. 2, a dashed-dotted line represents an outer contour of the fuel cell vehicle 110 on a ground GD inclined with respect to the horizontal plane, as viewed in a direction from a front side to a rear side. FIG. 2 illustrates the fuel cell 20 mounted in the fuel cell vehicle 110, and also illustrates a part of the anode gas supplying unit 50 connected to the fuel cell 20. FIG. 2 schematically illustrates liquid accumulated in a discharging manifold 25. Furthermore, FIG. 2 illustrates an arrow G representing the direction of gravity and a horizontal axis HX in parallel with the horizontal plane.

The fuel cell 20 is disposed in the fuel cell vehicle 110 with the stacking direction of the unit cells 21 substantially in parallel with the width direction of the fuel cell vehicle 110. In the fuel cell 20, a supplying manifold 24 and the discharging manifold 25, as the gas flow path on the anode side, extend in the stacking direction of the unit cells 21. In the fuel cell vehicle 110, the supplying manifold 24 on the anode side is positioned on the upper side and the discharging manifold 25 on the anode side is positioned on the lower side. In this disposed state, as shown by broken line arrow, the water on the anode side of each unit cell 21 flows toward the discharging manifold 25 due to the flow of the anode gas and the gravity. As a result, the water flows into the anode exhaust gas pipe 61 together with the anode exhaust gas including the anode gas. In the fuel cell vehicle 110 according to the present embodiment, the scavenging gas transmitted from the anode gas supplying unit 50 flows in the fuel cell 20 in the route similar to that of the anode gas, in the anode scavenging processing executed by the scavenging processor 15.

In the fuel cell system 100 according to the present embodiment, the anode gas supplying unit 50 functions as a scavenging gas supplying unit that transmits the scavenging gas into the gas flow path on the anode side in the fuel cell 20 in the anode scavenging processing. The scavenging processor 15 drives the hydrogen circulation pump 64 in a state where hydrogen supply from the hydrogen tank 52 through the hydrogen supplying device 55 is stopped. Thus, residual gas, including hydrogen remaining in the gas flow path on the anode side of the fuel cell 20 and the pipes 51, 61, and 63 of the anode gas supplying unit 50, is circulated as the scavenging gas. Thus, scavenging is performed in the fuel cell 20 and in the pipes 51, 61, and 63.

The exhaust water discharged from the fuel cell 20 and the pipes 51, 61, and 63 by the scavenging gas is stored in the internal space 80 of the gas-liquid separator 62. The scavenging processor 15 periodically opens the water discharge valve 66 while the scavenging gas is circulated by the hydrogen circulation pump 64, whereby the exhaust water LW stored in the gas-liquid separator 62 is discharged to the outside. This step of discharging water corresponds to a subordinate concept of a water discharge step in the present invention. The scavenging processor 15 controls the rotational speed of the hydrogen circulation pump 64 and an opening/closing interval of the water discharge valve 66 in the anode scavenging processing described below.

Figure 3:
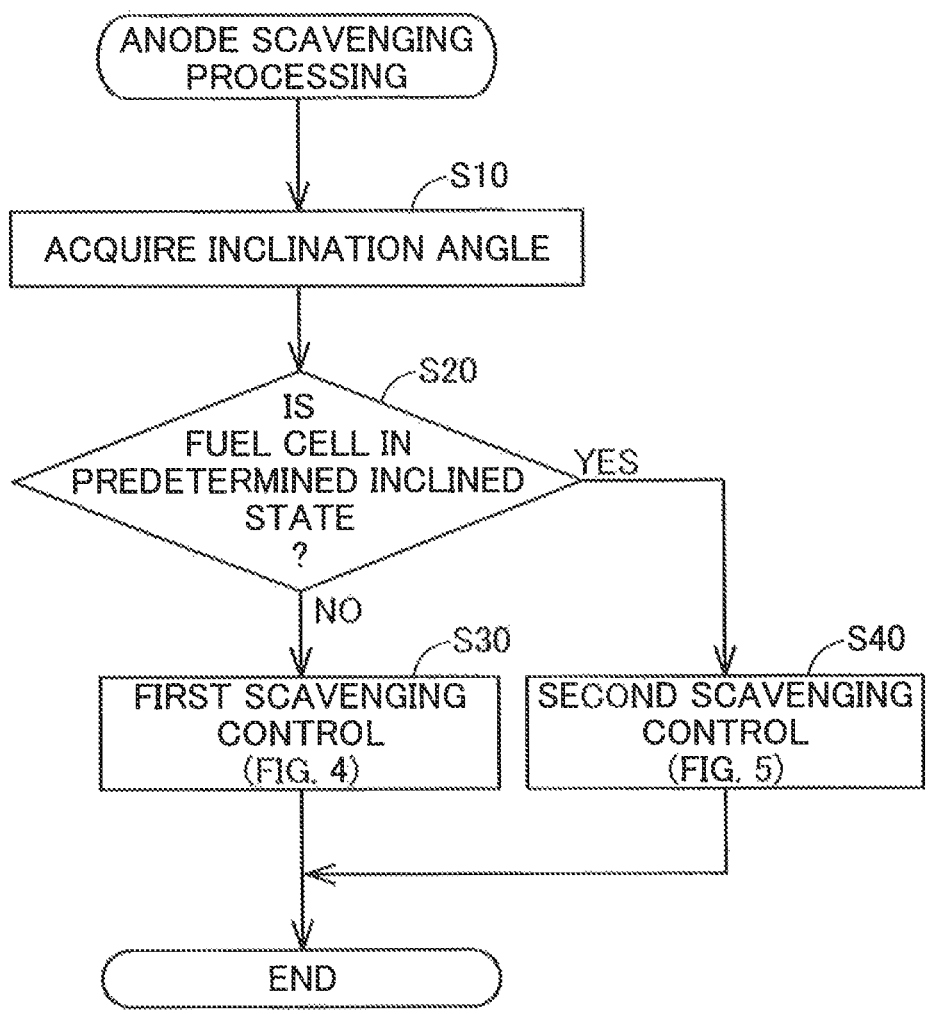
FIG. 3 is a flowchart of anode scavenging processing.

FIG. 3 is a flowchart of the anode scavenging processing executed by the scavenging processor 15. The fuel cell vehicle 110 executes the anode scavenging processing, so that the water remaining in the fuel cell 20 and the anode gas supplying unit 50 is discharged outside to be reduced, while an operation of the fuel cell 20 is terminated or temporarily stopped. With the anode scavenging processing, the degrading of the startability of the system caused by freezing of the residual water is suppressed, and the deteriorating of the parts in the system caused by the residual water is also suppressed. The scavenging processor 15 executes the different scavenging controls in accordance with the current disposed state in the fuel cell vehicle 110 as described below.

In step S10, the scavenging processor 15 acquires the inclination angle of the fuel cell vehicle 110 with respect to the horizontal plane in the width direction from the inclination angle detector 70. The inclination angle detected by the inclination angle detector 70 is a parameter representing an inclined state of the fuel cell vehicle 110 with respect to the horizontal plane. A processing step in step S10 corresponds to a subordinate concept of an inclined state detection step in the present invention. In step S20, the scavenging processor 15 determines, based on the inclination angle, whether the fuel cell 20 is in an inclined state with such a predetermined inclination angle that an outlet of the discharging manifold 25 on the anode side is directed upward against the direction of gravity.

In the fuel cell vehicle 110 shown in the FIG. 2 in the present embodiment, the fuel cell 20 is disposed so that the stacking direction of the unit cells 21 is substantially in parallel with the width direction of the fuel cell vehicle 110.

The scavenging processor 15 determines whether the fuel cell vehicle 110 is inclined at an inclination angle θ, which is larger than a predetermined threshold angle (for example 5 to 15°), with respect to the horizontal plane in a direction that a side of the first end plate 22 of the fuel cell 20 is positioned upward against the direction of gravity.

In the case that the inclination angle θ is equal to or smaller than the threshold angle, the scavenging processor 15 determined that the fuel cell 20 is not in the inclined state where the outlet of the discharging manifold 25 on the anode side directed upward against the direction of gravity, and executes a first scavenging control in step S30 in FIG. 3. On the other hand, in the case that the inclination angle θ is larger than the threshold angle, the scavenging processor 15 determined that the fuel cell 20 is in the inclined state with the outlet of the discharging manifold 25 on the anode side directed upward against the direction of gravity, and executes a second scavenging control in step S40.

Figure 4:
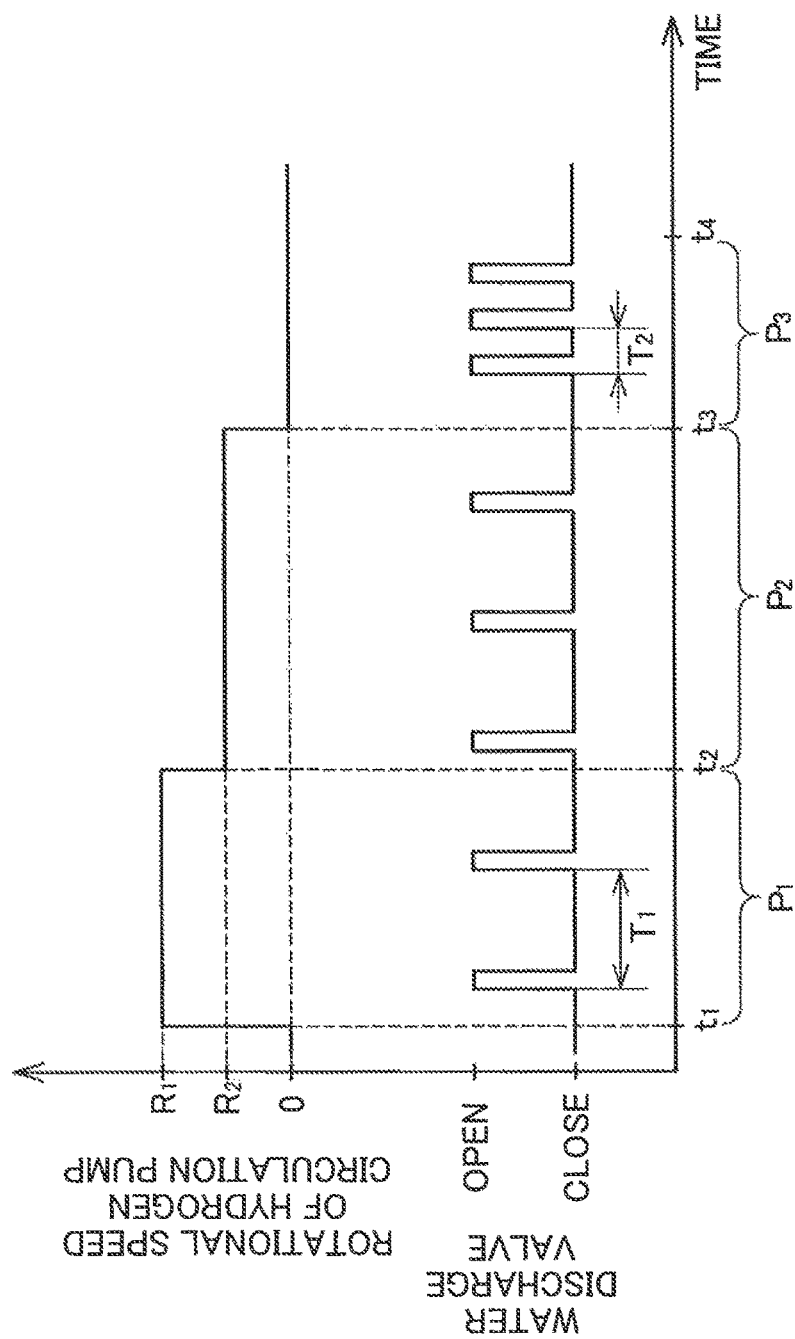
FIG. 4 is a diagram illustrating first scavenging control.

FIG. 4 is a diagram illustrating the first scavenging control. FIG. 4 is an example of a timing chart illustrating timing at which the rotational speed of the hydrogen circulation pump 64 changes and timing at which the water discharge valve 66 is opened and closed, in the first scavenging control. In the first scavenging control, the scavenging processor 15 first drives the hydrogen circulation pump 64 at a predetermined first rotational speed $R_1$, in a first period $P_1$ between time points $t_1$ and $t_2$, so that the scavenging gas circulates in the fuel cell 20 and the anode gas supplying unit 50. The first rotational speed $R_1$ and the length of the first period $P_1$ may be set to the experimentally determined values such that the residual water in the fuel cell 20 is discharged to the anode exhaust gas pipe 61.

At the time point $t_2$, the scavenging processor 15 reduces the rotational speed of the hydrogen circulation pump 64 from the first rotational speed $R_1$ to a second rotational speed $R_2$, which is lower than the first rotational speed $R_1$. The hydrogen circulation pump 64 continues to be driven at the second rotational speed $R_2$ until a time point $t_3$. The scavenging processor 15 stops driving the hydrogen circulation pump 64 at the time point $t_3$. The scavenging gas circulates in a second period $P_2$ between the time points $t_2$ and $t_3$ to discharge the residual water in the pipes 51, 61, and 63 in the anode gas supplying unit 50 with small pressure loss. Thus, the supply flow rate of the scavenging gas may be lower than that in the first period $P_1$. Thus, increase in the energy consumption amount and noise due to the scavenging caused by driving hydrogen circulation pump 64 with an excessively high rotational speed is prevented.

The scavenging processor 15 opens the water discharge valve 66 only for a short period of time, that is several seconds for example, at the predetermined first interval $T_1$, during the first period $P_1$ and the second period $P_2$ in which the scavenging gas is circulated by the driving of the hydrogen circulation pump 64. By repeatedly opening and closing the water discharge valve 66, the exhaust water stored in the gas-liquid separator 62 is periodically discharged by the circulating scavenging gas.

The scavenging processor 15 repeats the opening and closing of the water discharge valve 66 at a second interval $T_2$ shorter than the first interval $T_1$, during a third period $P_3$ between the time point $t_3$ and a time point $t_4$ after the hydrogen circulation pump 64 stops driving. Each time the opening and closing of the water discharge valve 66 are repeated, gas is ejected from the water discharge valve 66 due to the difference between the back pressure on the anode side of the fuel cell 20 and atmospheric pressure. Thus, a portion between a valve body and a valve seat of the water discharge valve 66 is scavenged, whereby the water discharge valve 66 is prevented from sticking by freezing or deteriorating due to the water attached thereto. As described above, in the first scavenging control, the scavenging is executed in the three periods $P_1$ to $P_3$ that are different from each other in the supply flow rate and the water discharge interval of the scavenging gas.

Figure 5:
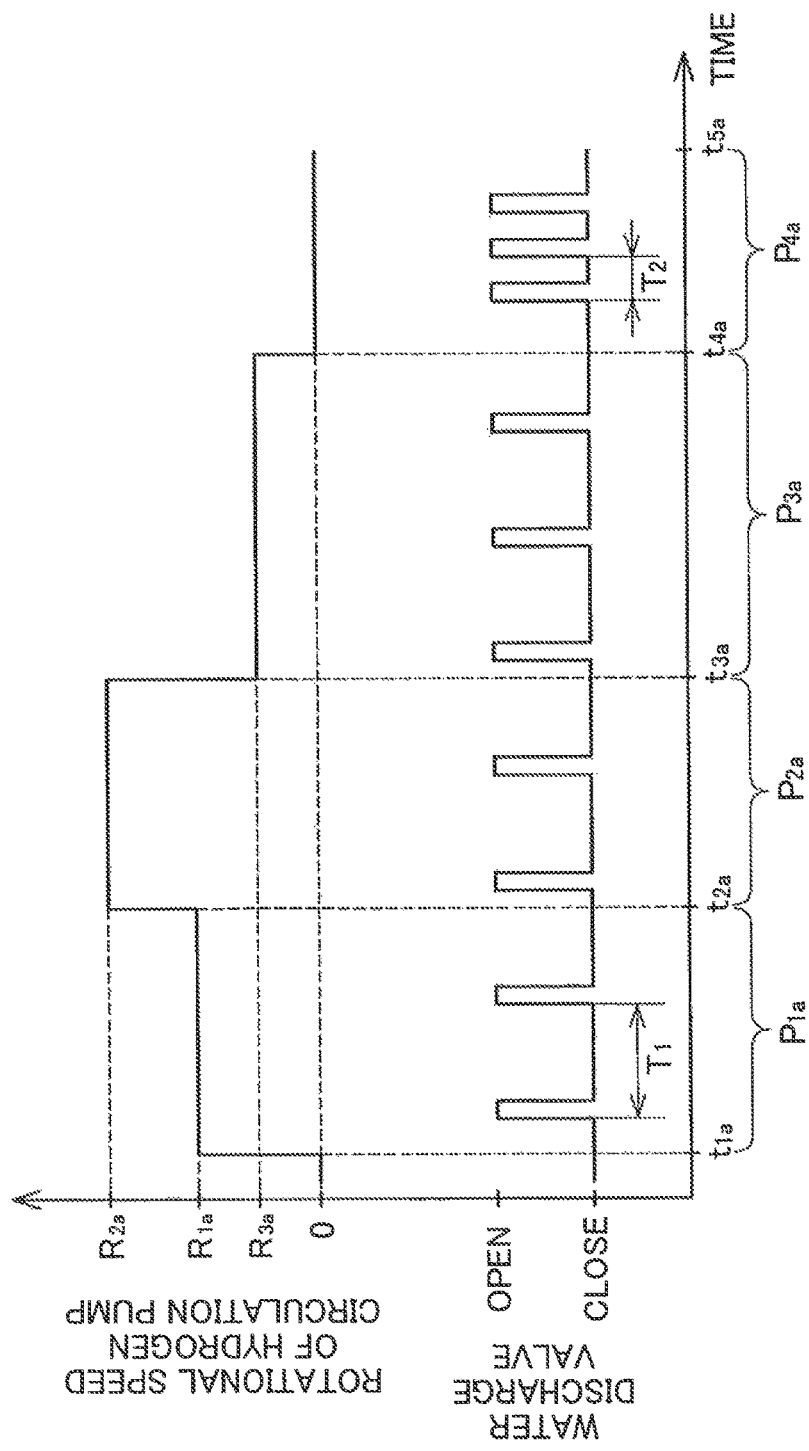
FIG. 5 is a diagram illustrating second scavenging control.

FIG. 5 is a diagram illustrating the second scavenging control. FIG. 5 illustrates an example of a timing chart similar to that in FIG. 4. In the second scavenging control, the scavenging processor 15 first drives the hydrogen circulation pump 64 at a predetermined first rotational speed $R_{1a}$, in a first period $P_{1a}$ between time points $t_{1a}$ and $t_{2a}$.

In the present embodiment, the first rotational speed $R_{1a}$ in the second scavenging control is substantially the same as the first rotational speed $R_1$ in the first scavenging control, and the length of the first period $P_{1a}$ in the second scavenging control is substantially the same as the length of the first period $P_1$ in the first scavenging control. Thus, an object of the first stage of the second scavenging control, that is, in the first period $P_{1a}$ is to discharge the residual water in the gas flow path on the anode side in the fuel cell 20, as in the first period $P_1$ of the first scavenging control. A step of starting the scavenging at the time point $t_{1a}$ corresponds to a subordinate concept of a scavenging start step in the present invention. The step of driving the hydrogen circulation pump 64 at the first rotational speed $R_{1a}$, corresponds to the step of supplying the scavenging gas at a first supply flow rate.

Then, in a second period $P_{2a}$ between the time point $t_{2a}$ and a time point $t_{3a}$, the scavenging processor 15 changes the rotational speed of the hydrogen circulation pump 64 from the first rotational speed $R_{1a}$ to a second rotational speed $R_{2a}$ which is higher than the first rotational speed $R_{1a}$. Thus, the supply flow rate of the scavenging gas for the gas flow path on the anode side in the fuel cell 20 is increased to be higher than that in the first period $P_1$. When the fuel cell 20 is in the inclined state in which the second scavenging control is executed, the exhaust water LW might be accumulated on the side of the second end plate 23 in the fuel cell 20 as shown in FIG. 2. Thus, in the second period $P_{2a}$, the supply flow rate of the scavenging gas is increased to facilitate the discharging of the accumulated exhaust water LW to the outside of the fuel cell 20. A step of increasing the rotational speed of the hydrogen circulation pump 64 at the time point $t_{2a}$ corresponds to a subordinate concept of a supply flow rate increase step in the present invention. The increase of the rotational speed of the hydrogen circulation pump 64 from the first rotational speed $R_{1a}$ to the second rotational speed $R_{2a}$ corresponds to an increase of a supply flow rate of scavenging gas from the first supply flow rate to a second supply flow rate.

In a third period $P_{3a}$ between the time point $t_{3a}$ and a time point $t_{4a}$, the scavenging processor 15 reduces the rotational speed of the hydrogen circulation pump 64 to a third rotational speed $R_{3a}$. In the present embodiment, the third rotational speed $R_{3a}$ in the second scavenging control is substantially the same as the second rotational speed $R_2$ (FIG. 4) in the first scavenging control. The scavenging in the third period $P_{3a}$ is executed to discharge the residual water in the pipes 51, 61, and 63 in the anode gas supplying unit 50, as in the second period $P_2$ in the first scavenging control. In the third period $P_{3a}$, the rotational speed of the hydrogen circulation pump 64 is reduced so that the energy consumption amount and the noise are prevented from increasing while the scavenging is being executed. The scavenging processor 15 stops driving the hydrogen circulation pump 64 at the time point $t_{4a}$.

In the first period $P_{1a}$ to the third period $P_{3a}$ in which the scavenging gas is circulated by the driving of the hydrogen circulation pump 64, the scavenging processor 15 opens the water discharge valve 66 for only a short period of time at the predetermined first interval $T_1$, as in the first scavenging control. Thus, the exhaust water stored in the gas-liquid separator 62 is periodically discharged by the circulating scavenging gas. As in the third period $P_3$ in the first scavenging control, the scavenging processor 15 repeats the opening and closing of the water discharge valve 66 at the second interval $T_2$ shorter than the first interval $T_1$, during a fourth period $P_{4a}$ between the time point $t_{4a}$ and a time point $t_{5a}$ after the hydrogen circulation pump 64 stops driving. Thus, the scavenging is performed on the water discharge valve 66, whereby the water discharge valve 66 is prevented from sticking by freezing and from deteriorating due to the water attached thereto. As described above, in the second scavenging control, the scavenging is executed in the four periods $P_{1a}$ to $P_{4a}$ that are different from each other in the supply flow rate and the water discharge interval of the scavenging gas.

In the second scavenging control, after a certain amount of exhaust water in the fuel cell 20 is discharged in the first period $P_{1a}$, the scavenging for the fuel cell 20 is additionally performed with the scavenging gas with a high supply flow rate. Thus, the performance of discharging the exhaust water accumulated in the fuel cell 20 which is inclined is enhanced. When the rotational speed of the hydrogen circulation pump 64 is increased in the second period $P_{2a}$, the water is periodically discharged from the gas-liquid separator 62 in the first period $P_1$. In the second period $P_{2a}$, the rotational speed of the hydrogen circulation pump 64 is increased in a state where the water in the gas-liquid separator 62 is reduced. Thus, the water in the gas-liquid separator 62 is prevented from being sucked into the hydrogen circulation pump 64 due to the increase in the rotational speed.

As described above, in the anode scavenging processing according to the first embodiment, the second scavenging control is executed instead of the first scavenging control when the fuel cell 20 is in the inclined state with the outlet of the discharging manifold 25 directed upward. Thus, discharging of the exhaust water is facilitated.

B. Second Embodiment

Figure 6:
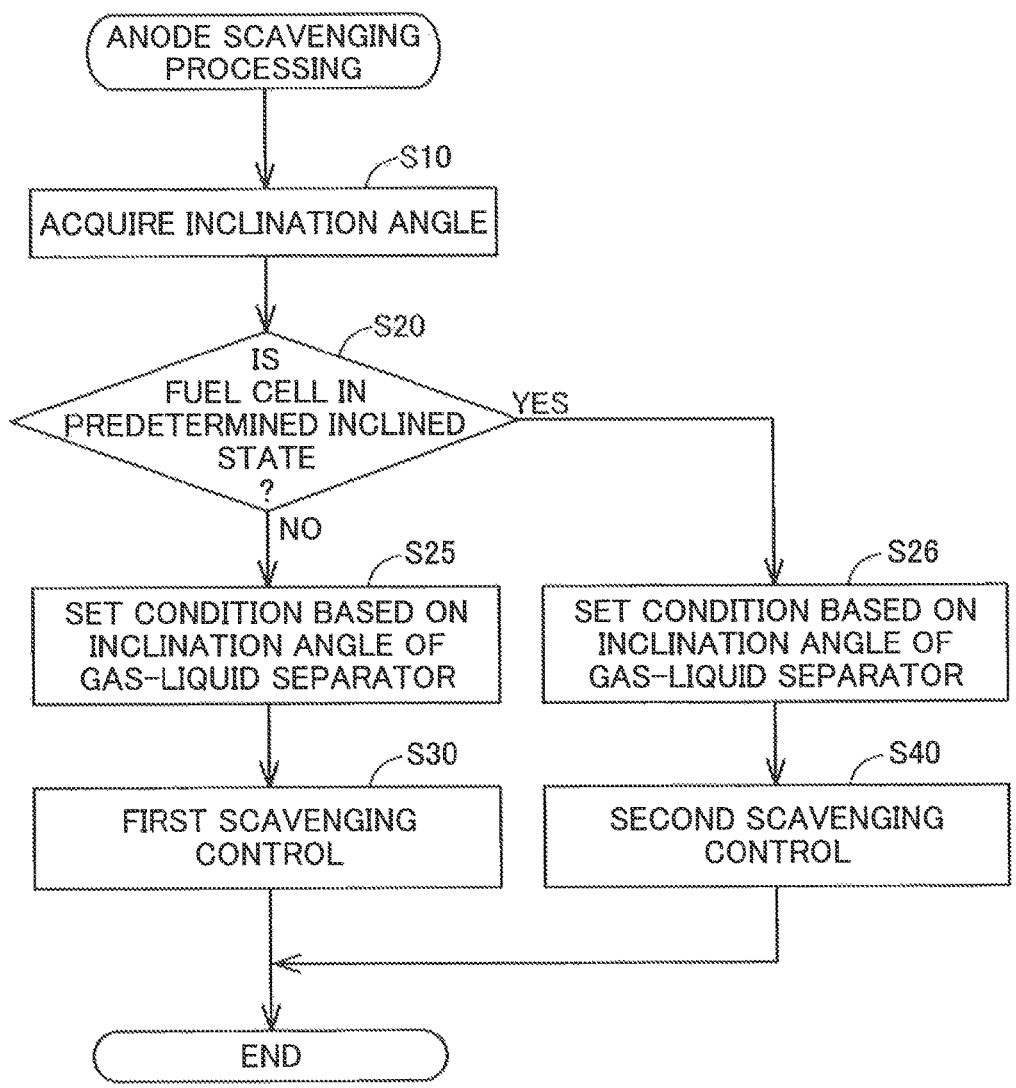
FIG. 6 is a flowchart of anode scavenging processing according to a second embodiment.

FIG. 6 is a flowchart of the anode scavenging processing according to a second embodiment of the present invention. The anode scavenging processing in the second embodiment is executed in the fuel cell vehicle 110 including the fuel cell system 100 having the same configuration as that described in the first embodiment shown in FIGS. 1 and 2. The anode scavenging processing in the second embodiment is substantially the same as the anode scavenging processing in the first embodiment, except that processing in steps S25 and S26 described later is added to change a scavenging condition in the first scavenging control and the second scavenging control. The scavenging processor 15 changes the scavenging condition in each scavenging control based on the inclination angle of the gas-liquid separator 62 in steps S25 and S26, after the first scavenging control or the second scavenging control is determined to be executed in step S20.

Figure 7:
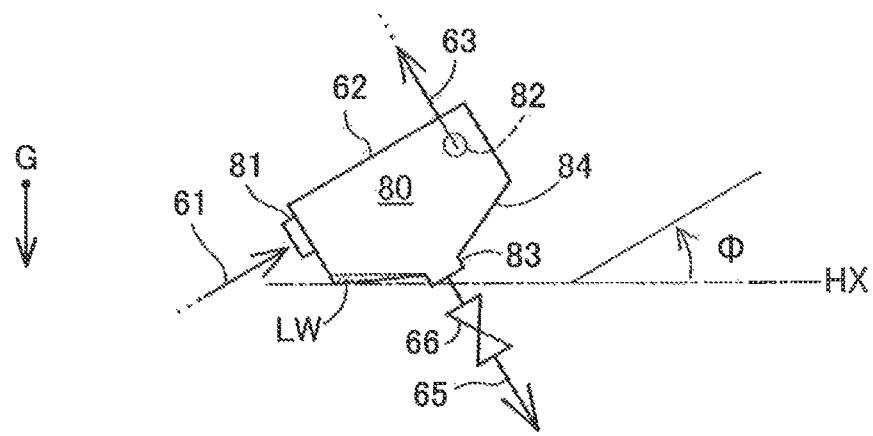
FIG. 7 is a schematic view illustrating an example of an inclined state of a gas-liquid separator.

With referring to FIGS. 7 to 10, describe the processing of changing the scavenging condition in the first scavenging control or the second scavenging control based on the inclination angle of the gas-liquid separator 62. FIG. 7 is a schematic view illustrating an example of the inclined state of the gas-liquid separator 62. FIG. 7 illustrates the inclined gas-liquid separator 62 and the horizontal axis FIX in parallel with the horizontal plane. Depending on the inclined state of the fuel cell vehicle, the gas-liquid separator 62 might be inclined, and the water discharge port 83 might be positioned above the inner wall surface of the inclined wall surface 84 in the direction of gravity. In such an inclined state, the exhaust water LW might be accumulated in a portion below the water discharge port 83 in the direction of gravity.

The scavenging processor 15 calculates an inclination angle $\Phi$ of the gas-liquid separator 62 with respect to the horizontal plane, based on the inclination angle of the fuel cell vehicle in the width direction and the front and rear direction acquired in step S10 and the disposed angle of the gas-liquid separator 62 in the fuel cell vehicle 110. The inclination angle Φ matches an angle between the direction of gravity and the opening direction of the water discharge port 83 of the gas-liquid separator 62. The scavenging processor 15 changes the supply flow rate of the scavenging gas based on the inclination angle Φ when the inclination angle Φ of the gas-liquid separator 62 is larger than a predetermined threshold angle and the angle is achieved with which the water discharge port 83 is disposed above the inner wall surface of the inclined wall surface 84 in the direction of gravity. For example, the predetermined threshold angle may be set to a value that is the same as an angle of the inner wall surface of the inclined wall surface 84 with respect to the horizontal plane in a state where the fuel cell vehicle 110 is disposed on the horizontal plane. The scavenging processor 15 determines the supply flow rate of the scavenging gas in accordance with the inclination angle Φ of the gas-liquid separator 62 with a map described below.

In the map used in this second embodiment, the relationship that the pressure of the anode-side outlet, that is the back pressure on the anode side of the fuel cell 20, increases so as to draw the downwards convex curve according to increasing of the inclination angle Φ of the gas-liquid separator 62, is set. The scavenging processor 15 acquires a target pressure Pa on the anode outlet side of the fuel cell 20 with respect to the inclination angle Φ of the gas-liquid separator 62 by referring to the map prepared in advance. Thus, the scavenging processor 15 determines a target supply flow rate of the scavenging gas for achieving the target pressure Pa. The scavenging processor 15 changes the rotational speed of the hydrogen circulation pump 64 based on the target supply flow rate of the scavenging gas.

Figure 8:
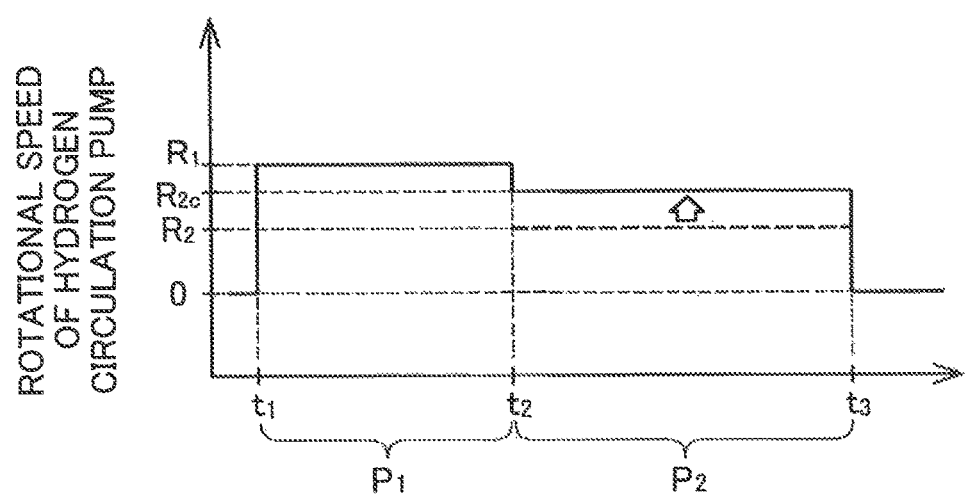
FIG. 8 is a diagram illustrating how a scavenging condition is changed in the first scavenging control.

FIG. 8 is a diagram illustrating how the scavenging condition is changed in the first scavenging control. When executing the first scavenging control, the scavenging processor 15 increases the rotational speed $R_2$ of the hydrogen circulation pump 64 in the second period $P_2$ in the first scavenging control to a rotational speed $R_{2c}$ based on the target pressure Pa on the anode side. Thus, in the second period $P_2$, the anode pressure of the fuel cell 20 is increased to the target pressure $P_2$, whereby the pressure in the internal space 80 of the gas-liquid separator 62 rises. Thus, a flow speed of the exhaust water when the water discharge valve 66 is opened increases, and thus the discharging of the exhaust water LW accumulated by the inclination of the gas-liquid separator 62 is facilitated. The rotational speed of the hydrogen circulation pump 64 increases to be higher than that in the normal state in the second period $P_2$ after the water has been discharged from the gas-liquid separator 62 in the first period $P_1$. Thus, the exhaust water is prevented from being sucked into the hydrogen circulation pump 64 from the gas-liquid separator 62 along with the increase in the rotational speed of hydrogen circulation pump 64.

Figure 9:
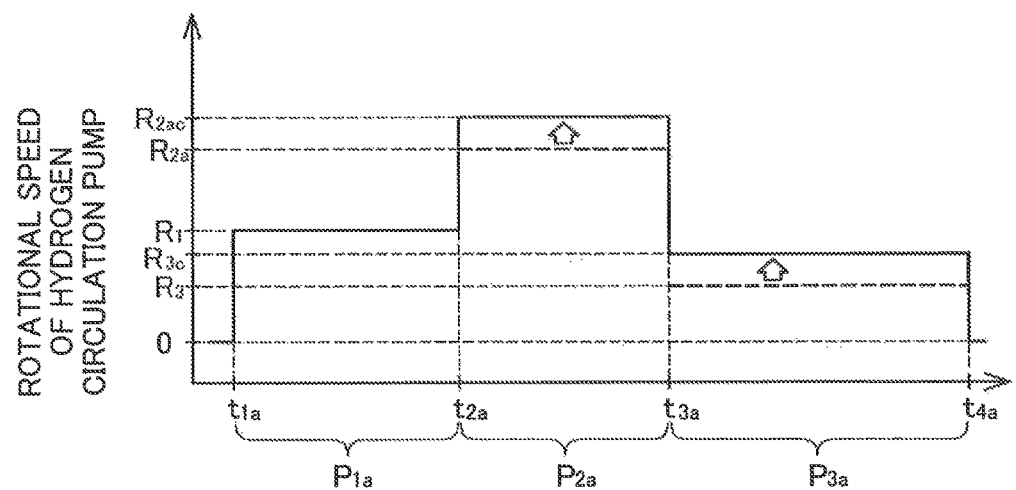
FIG. 9 is a diagram illustrating how a scavenging condition is changed in the second scavenging control.

FIG. 9 is a diagram illustrating how the scavenging condition is changed in the second scavenging control. When executing the second scavenging control, the scavenging processor 15 increases the rotational speeds $R_{2a}$ and $R_{3a}$ of the hydrogen circulation pump 64 in the second period $P_{2a}$ and the third period $P_{3a}$ in the second scavenging control respectively to rotational speeds $R_{2ac}$ and $R_{3ac}$ based on the target pressure Pa on the anode side. Thus, in the second period $P_{2a}$ and the third period $P_{3a}$, the anode pressure of the fuel cell 20 is increased to the target pressure Pa, whereby the pressure in the internal space 80 of the gas-liquid separator 62 rises. Thus, a speed of the exhaust water flowing after opening the water discharge valve 66 increases, and thus the discharging of the exhaust water LW accumulated by the inclination of the gas-liquid separator 62 is facilitated. The rotational speed of the hydrogen circulation pump 64 increases to be higher than that in the normal state in the periods $P_{2a}$ and $P_{3a}$ after the water has been discharged from the gas-liquid separator 62 in the first period $P_{1a}$. Thus, the exhaust water is prevented from being sucked into the hydrogen circulation pump 64 from the gas-liquid separator 62 along with the increase in the rotational speed of the hydrogen circulation pump 64.

The scavenging processor 15 may change the scavenging condition as described below, in addition to the changing of the rotational speed of the hydrogen circulation pump 64 based on the inclination angle Φ of the gas-liquid separator 62 described above. More specifically, the scavenging processor 15 may set the predetermined interval $T_1$ of opening the water discharge valve 66 to be a shorter interval (the corrected interval $T1_c$) in accordance with a larger inclination angle Φ in the first scavenging control and the second scavenging control. Thus, the number of times the water is discharged from the gas-liquid separator 62 increases, and whereby the discharging of water from the gas-liquid separator 62 is facilitated. In the inclined state where the water discharge port 83 of the gas-liquid separator 62 is disposed above the inner wall surface of the inclined wall surface 84 in the direction of gravity, the scavenging processor 15 may only change the opening and closing interval $T_1$ of the water discharge valve 66, instead of changing the rotational speed of the hydrogen circulation pump 64 based on the inclination angle Φ.

Figure 10:
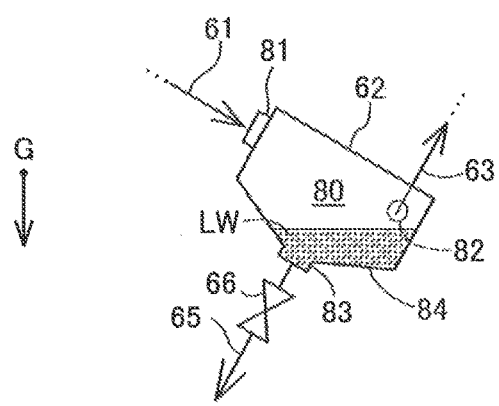
FIG. 10 is a schematic view illustrating an example of another inclined state of the gas-liquid separator.

FIG. 10 is a schematic view illustrating an example of another inclined state of the gas-liquid separator 62. Depending on the inclined state of the fuel cell vehicle, the gas-liquid separator 62 might be inclined in a direction in which a water surface of the exhaust water LW in the internal space 80 approaches the outlet port 82. More specifically, the gas-liquid separator 62 might be inclined to have the opening direction of the inlet port 81, directed to the internal space 80, directed downward in the direction of gravity. Furthermore, the gas-liquid separator 62 might be inclined to have the inner wall surface of the internal space 80, on which the outlet port 82 is formed, disposed on the lower side in the direction of gravity. Upon detecting such an inclined state of the gas-liquid separator 62 based on the inclination angle of the fuel cell vehicle in the width direction and the front and rear direction, the scavenging processor 15 shortens the interval $T_1$ of opening the water discharge valve 66 in the first scavenging control and the second scavenging control as described above. Thus, the number of times the water is discharged from the gas-liquid separator 62 per unit time in the first scavenging control and the second scavenging control increases, whereby the amount of the exhaust water LW is quickly reduced and the exhaust water LW is prevented from entering the outlet port 82. The scavenging processor 15 may change the valve opening period, each time the water discharge valve 66 is opened, to be long in the first scavenging control and the second scavenging control.

In the anode scavenging processing according to the second embodiment described above, the scavenging condition is changed in accordance with the inclination of the gas-liquid separator 62, whereby the discharging of water from the gas-liquid separator 62 is facilitated. The anode scavenging processing according to the second embodiment is possible to provide an effect that is the same as those described in the first embodiment.

C. Third Embodiment

Figure 11:
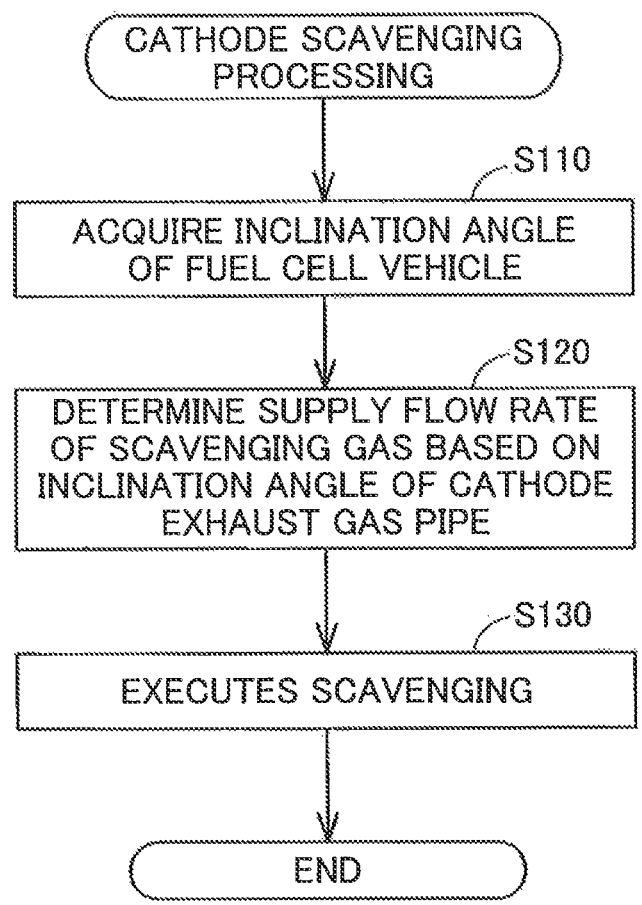
FIG. 11 is a flowchart illustrating cathode scavenging processing according to a third embodiment.

FIG. 11 is a flowchart illustrating cathode scavenging processing according to a third embodiment of the present invention. The cathode scavenging processing according to the third embodiment is executed, in the fuel cell vehicle 110 including the fuel cell system 100 having the same configuration as that described in the first embodiment with reference to FIGS. 1 and 2, by the scavenging processor 15, together with the anode scavenging processing described in the first embodiment. The cathode scavenging processing is processing of performing scavenging for the gas flow path on the cathode side in the fuel cell 20 and the pipes 31 and 41 of the cathode gas supplying unit 30 by using the outer air taken in as the scavenging gas by the air compressor 32 of the cathode gas supplying unit 30. In the fuel cell system 100 in the third embodiment, the anode gas supplying unit 50 functions as a first scavenging gas supplying unit, and the cathode gas supplying unit 30 functions as a second scavenging gas supplying unit. The cathode scavenging processing is executed when the operation of the fuel cell 20 is terminated or temporarily stopped. The cathode scavenging processing may be executed in parallel with the anode scavenging processing, or may be executed at timing different from that of the anode scavenging processing. A scavenging step in the anode scavenging processing corresponds to a subordinate concept of the first scavenging step in the present invention. A scavenging step in the cathode scavenging processing corresponds to a subordinate concept of the second scavenging step in the present invention.

In step S110, the scavenging processor 15 acquires the inclination angle of the fuel cell vehicle 110 with respect to the horizontal plane detected by the inclination angle detector 70. In step S120, the scavenging processor 15 detects the inclined state of the cathode exhaust gas pipe 41 based on the inclination angle of the fuel cell vehicle 110, and determines the target supply flow rate of the scavenging gas based on the inclination angle of the cathode exhaust gas pipe 41. In step S130, the scavenging processor 15 executes the scavenging by driving the air compressor 32 at the rotational speed based on the target supply flow rate of the scavenging gas.

Figure 12:
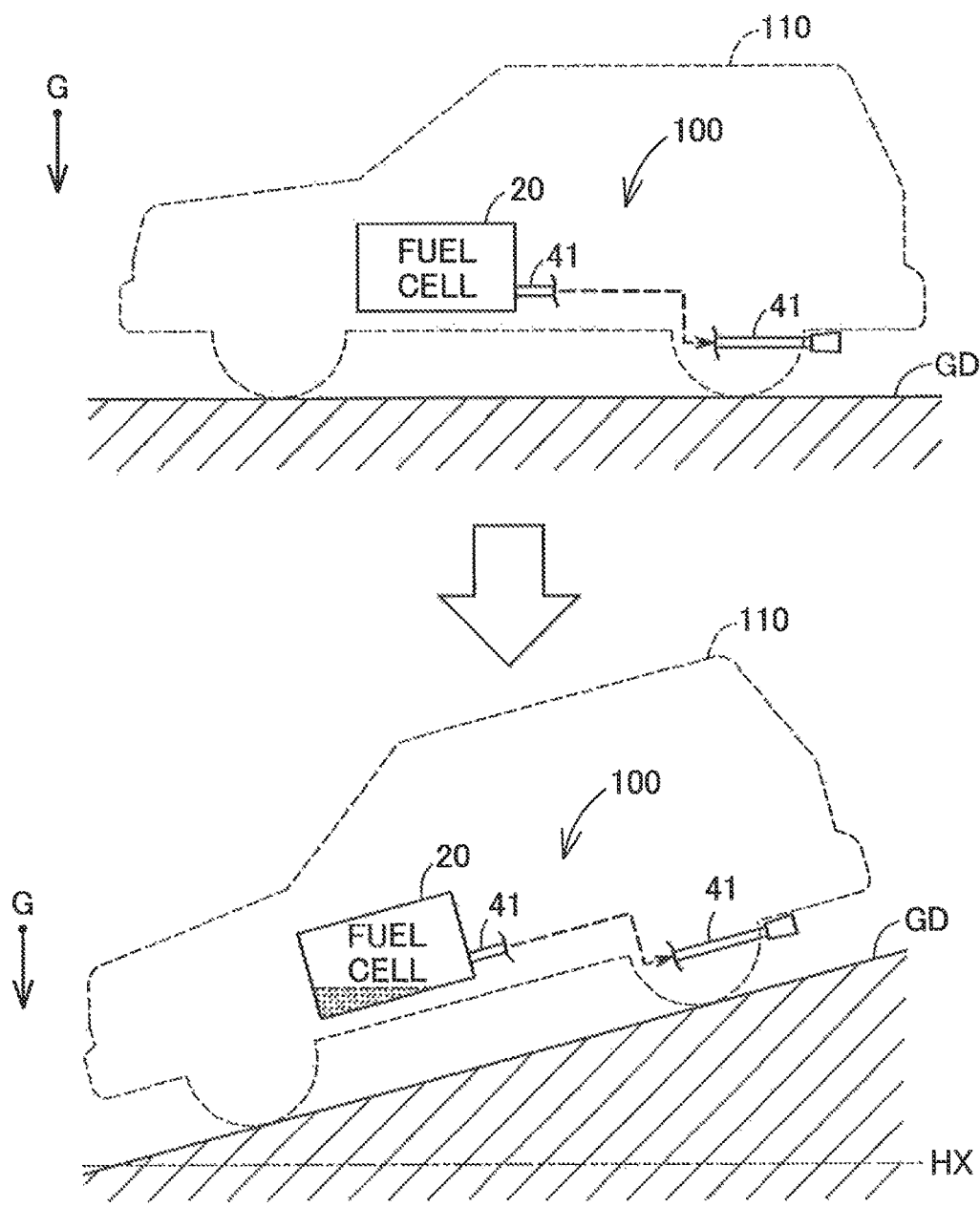
FIG. 12 is a schematic view illustrating an example of an inclined state of a cathode exhaust gas pipe in a fuel cell vehicle.

FIG. 12 is a schematic view illustrating an example of the inclined state of the cathode exhaust gas pipe 41 in the fuel cell vehicle 110. A state where the fuel cell vehicle 110 is disposed in parallel with the ground GD is schematically illustrated in an upper section of FIG. 12. A state where the fuel cell vehicle 110 is disposed with the front side facing downward in the direction of gravity is schematically illustrated in a lower section of FIG. 12. In the fuel cell vehicle 110, the cathode exhaust gas pipe 41 extends in the front and rear direction of the fuel cell vehicle 110, from the fuel cell 20 to a rear side of the fuel cell vehicle 110. In the inclined state where the downstream side of the cathode exhaust gas pipe 41 is directed upward against the direction of gravity as illustrated in the lower section of FIG. 12, the target supply flow rate of the scavenging gas is set to be higher in accordance with a larger inclination angle by the scavenging processor 15. Thus, discharging of the exhaust water accumulated on one side in the fuel cell 20 and the cathode exhaust gas pipe 41 due to the gravity is secured.

As described above, in the cathode scavenging processing according to the third embodiment, the supply flow rate of the scavenging gas is changed in accordance with the inclined state of the cathode exhaust gas pipe 41, whereby discharging of water by the cathode scavenging processing is facilitated. In the fuel cell vehicle 110 according to the third embodiment, the cathode scavenging processing and the anode scavenging processing are executed in the fuel cell system 100, whereby discharging of water in the gas flow path on the cathode side and the anode side in the fuel cell 20 is facilitated. The anode scavenging processing is possible to provide an effect that is the same as those described in the first embodiment and the second embodiment.

D. Modification

D1. Modification 1

In the anode scavenging processing according to the embodiments described above, the first rotational speed $R_{1a}$ of the hydrogen circulation pump 64 in the first period $P_{1a}$ in the second scavenging control is substantially the same value as the first rotational speed $R_1$ of the hydrogen circulation pump 64 in the first period $P_1$ in the first scavenging control. Alternatively, the first rotational speed $R_{1a}$ of the hydrogen circulation pump 64 in the first period $P_{1a}$ in the second scavenging control may be a value different from the first rotational speed $R_1$ of the hydrogen circulation pump 64 in the first period $P_1$ in the first scavenging control. The first rotational speed $R_{1a}$ of the hydrogen circulation pump 64 in the second scavenging control is preferably set to a rotational speed with which the exhaust water stored in the gas-liquid separator 62 is prevented from being sucked, and is preferably set to a rotational speed with which water can be discharged from the fuel cell 20.

D2. Modification 2

In the anode scavenging processing according to the embodiments described above, the length of the first period $P_{1a}$ in the second scavenging control is substantially the same as the length of the first period $P_1$ in the first scavenging control. Alternatively, the length of the first period $P_{1a}$ in the second scavenging control may be a value different from the length of the first period $P_1$ in the first scavenging control. The length of the first period $P_{1a}$ in the second scavenging control may be shorter than the length of the first period $P_1$ in the first scavenging control. The length of the first period $P_{1a}$ in the second scavenging control is preferably set to such a length that the amount of water stored in the gas-liquid separator 62 can be reduced to be small enough to be not sucked by the hydrogen circulation pump 64. The length of the first period $P_{1a}$ in the second scavenging control may be variably adjusted based on an amount of generated water or power generation amount during operation of the fuel cell 20.

D3. Modification 3

In the embodiments described above, the inclination angle detection step of detecting the inclination angle of the fuel cell vehicle 110 with respect to the horizontal plane is executed in step S10. Alternatively, the inclination angle detection step in step S10 may be omitted. For example, in this case, switching to the second scavenging control may be achieved, when the fuel cell 20 is in a predetermined inclined state with the outlet of the discharging manifold on the anode side directed upward, by a switch such as a pendulum that is physically displaced in accordance with the change in the direction of gravity.

D4. Modification 4

In the fuel cell vehicle 110 according to the embodiments described above, the fuel cell 20 is disposed to have the stacking direction of the unit cells 21 in parallel with the width direction of the fuel cell vehicle 110. Alternatively, the fuel cell vehicle 110 may be disposed with the fuel cell 20 having a different disposed angle. For example, in the fuel cell vehicle 110, the fuel cell 20 may be disposed to have the stacking direction of the unit cells 21 in parallel with the front and rear direction of the fuel cell vehicle 110, and to have the stacking direction of the unit cells 21 in parallel with a height direction of the fuel cell vehicle 110. The fuel cell 20 may be disposed to have the supplying manifold 24 on the anode side on the lower side and have the discharging manifold 25 on the anode side on the upper side.

D5. Modification 5

In the embodiments described above, the anode scavenging processing including the first scavenging control and the second scavenging control is executed with the anode gas supplying unit 50, circulating the residual gas including hydrogen as the scavenging gas with the hydrogen circulation pump 64, serving as the scavenging gas supplying unit. Alternatively, the cathode scavenging processing including the first scavenging control and the second scavenging control may be executed with the cathode gas supplying unit 30 serving as the scavenging gas supplying unit, instead of or in addition to the anode scavenging processing.

D6. Modification 6

In the anode scavenging processing according to the embodiments described above, the rotational speed of the hydrogen circulation pump 64 is increased from the first rotational speed $R_{1a}$ to the second rotational speed $R_{2a}$ stepwise, that is, in two stages in the second scavenging control (FIG. 5). Alternatively, the rotational speed of the hydrogen circulation pump 64 may be increased from the first rotational speed $R_{1a}$ to the second rotational speed $R_{2d}$ continuously and smoothly or stepwise, that is, in a plurality of stages. In the anode scavenging processing according to the embodiments described above, the rotational speed of the hydrogen circulation pump 64 is reduced in the second period $P_2$ in the first scavenging control, and is reduced in the third period $P_{3a}$ in the second scavenging control as shown in FIGS. 4 and 5. Alternatively, the rotational speed of the hydrogen circulation pump 64 may not be reduced in the second period $P_2$ in the first scavenging control or in the third period $P_{3a}$ in the second scavenging control, and the rotational speeds $R_1$ and $R_{2a}$ may be maintained in the previous periods $P_1$ and $P_{2a}$. The second rotational speed $R_2$ of the hydrogen circulation pump 64 in the second period $P_2$ in the first scavenging control may be a value different from the third rotational speed $R_{3a}$ of the hydrogen circulation pump 64 in the third period $P_{3a}$ in the second scavenging control. The opening/closing operation of the water discharge valve 66 may be omitted in the third period $P_3$ in the first scavenging control or in the fourth period $P_{4a}$ in the second scavenging control.

D7. Modification 7

In the embodiments described above, the inclination angle detector 70 is formed of the acceleration sensor. Alternatively, the inclination angle detector 70 may be formed of a sensor other than the acceleration sensor, or may detect the inclination angle of the fuel cell vehicle 110 through a method other than that using the sensor. For example, the inclination angle detector 70 may acquire geographic information of the current position of the fuel cell vehicle 110 based on a mounted navigation device and GPS information and may detect the inclination angle of the fuel cell vehicle 110 from the geographic information.

D8. Modification 8

In the second embodiment described above, the correction on the second rotational speed $R_2$ in the first scavenging control or on the second rotational speed $R_{2a}$ and the third rotational speed $R_{3b}$ in the second scavenging control is made in accordance with the inclination angle of the gas-liquid separator 62. Alternatively, the correction on the first rotational speeds $R_1$ and $R_{1a}$ in the first scavenging control and the second scavenging control or on any one of the second rotational speed $R_{2a}$ and the third rotational speed $R_{3b}$ in the second scavenging control may be made in accordance with the inclination angle of the gas-liquid separator 62.

The present invention is not limited to the embodiments, the examples, and the modifications described above, and may be implemented in various ways without departing from the gist of the present invention. For example, the technical features in the embodiments, the examples, the modifications corresponding to the technical features in each mode described in the summary section are replaced or combined as appropriate in order to partially or entirely solve the problem described above or to partially or entirely achieve the advantageous effects described above. Some technical features that are not described as being essential herein can be omitted as appropriate. Part or whole of the functions and processing implemented by software in the embodiment and the modifications described above can be implemented by hardware. Likewise, part or whole of the functions and processing implemented by hardware in the embodiment and the modifications described above can be implemented by software. Examples of the hardware may include various types of circuits such as integrated circuits, discrete circuits, or circuit modules that are combinations of these circuits.

What is claimed is:

1. A method of discharging water from a mobile object, which includes: a fuel cell discharging an exhaust gas; a gas-liquid separator separating the exhaust gas into a gas component and a liquid component, and storing the liquid component as an exhaust water; and a circulation pump sending out the gas component flown from the gas-liquid separator, the method comprising:
    an inclined state detection step of detecting an inclined state of the mobile object with respect to a horizontal plane;
    a scavenging start step of starting to supply scavenging gas at a predetermined first supply flow rate to a gas flow path in the fuel cell, by driving the circulation pump, when the mobile object is in a predetermined inclined state in which an outlet of the gas flow path is directed upward against a direction of gravity;
    a discharging water step of discharging the exhaust water stored in the gas-liquid separator while the scavenging gas is supplied to the fuel cell; and
    a supply flow rate increase step of increasing a rotational speed of the circulation pump so that the supply flow rate of the scavenging gas is increased to a second supply flow rate higher than the first supply flow rate after a certain amount of exhaust water has been discharged following starting to supply the scavenging gas.

2. The method in accordance with claim 1, wherein
the inclined state detection step is a step of acquiring an inclination angle of the mobile object with respect to the horizontal plane as a parameter expressing the inclined state of the mobile object, and
the supply flow rate increase step includes a step of changing the second supply flow rate in accordance with the inclination angle.

3. The method in accordance with claim 1, wherein
the inclined state detection step is a step of acquiring an inclination angle of the mobile object with respect to the horizontal plane as a parameter expressing the inclined state of the mobile object, and
the discharging water step is a step of discharging the exhaust water at a predetermined water discharge interval, and includes a step of changing the water discharge interval in accordance with the inclination angle.

4. The method in accordance with claim 1, further comprising:
a first scavenging step of scavenging a first gas flow path, which is the gas flow path supplied a first reactive gas that is one reactive gas used for the generating of the fuel cell, by using the scavenging gas as first scavenging gas; and
a second scavenging step of scavenging a second gas flow path, which is provided in the fuel cell and supplied a second reactive gas that is another reactive gas, by supplying a second scavenging gas that is different from the first scavenging gas, and introducing an exhaust water discharged from the second gas flow path to an outside of the mobile object through a water discharge pipe connected to the fuel cell, wherein
in the first scavenging step, the scavenging start step, the discharging water step, and the supply flow rate increase step are executed, and
in the second scavenging step, the inclined state of the mobile object with respect to the horizontal plane is detected, and a step of increasing a flow rate of the second scavenging gas is executed when the mobile object is in a predetermined inclined state where a direction of the water discharge pipe extending toward a downstream side is directed upward against the direction of gravity.

5. A fuel cell system installed in a mobile object, the fuel cell system comprising:
a fuel cell incorporating a gas flow path for reaction gas;
a gas-liquid separator that separates exhaust gas from the fuel cell into a gas component and a liquid component, and stores the liquid component as exhaust water;
a circulation pump that circulates the gas component, obtained by the separation in the gas-liquid separator, to the fuel cell;
an on-off valve that controls discharging of the exhaust water from the gas-liquid separator through an opening and closing operation;
a controller programmed to execute a scavenging processing of circulating scavenging gas to the fuel cell by driving the circulation pump, and execute a water discharge processing of discharging the exhaust water from the gas-liquid separator by opening the water discharge valve while the scavenging gas is supplied to the fuel cell; and
an inclined state detector configured to detect an inclined state of the mobile object with respect to a horizontal plane, wherein
the controller is programmed to start, in the scavenging processing, supplying the scavenging gas to the gas flow path in the fuel cell at a predetermined first supply flow rate when the mobile object is in a predetermined inclined state where an outlet of the gas flow path is directed upward against a direction of gravity, and
the controller is programmed to increase a rotational speed of the circulation pump in the scavenging processing so that the supply flow rate of the scavenging gas is increased to a second supply flow rate higher than the first supply flow rate after a certain amount of exhaust water has been discharged following starting to supply the scavenging gas.

6. The fuel cell system in accordance with claim 5, wherein
the inclined state detector is configured to acquire an inclination angle of the mobile object with respect to the horizontal plane, and
the controller is programmed to change the second supply flow rate in accordance with the inclination angle.

7. The fuel cell system in accordance with claim 5, wherein
the inclined state detector is configured to acquire an inclination angle of the mobile object with respect to the horizontal plane as a parameter expressing the inclined state of the mobile object,
the water discharge processing including a step of opening the on-off valve at a predetermined water discharge interval, and
the controller is programmed to change the water discharge interval in accordance with the inclination angle in the water discharge processing.

8. The fuel cell system in accordance with claim 5, wherein
the fuel cell includes:
a first electrode;
a second electrode;
a first gas flow path connected to the first electrode; and
a second gas flow path connected to the second electrode, wherein
the gas-liquid separator is connected to the first gas flow path,
the scavenging processing is a first scavenging processing of scavenging the first gas flow path by supplying the scavenging gas to the fuel cell as a first scavenging gas,
a water discharge pipe connected to the second gas flow path is configured to guide the exhaust water in the fuel cell to an outside of the mobile object,
the controller is programmed to execute a second scavenging processing of scavenging the second gas flow path by supplying second scavenging gas, and guiding the exhaust water discharged from the second gas flow path to the outside of the mobile object through the water discharge pipe when the inclined state detector detects that the mobile object is in a predetermined inclined state where a downstream side of the water discharge pipe is directed upward against the direction of gravity, and
the controller is programmed to increase a flow rate of the second scavenging gas in the second scavenging processing after a certain amount of exhaust water has been discharged following starting to supply the second scavenging gas.

* * * * *